United States Patent
McElvain

(12) 
(10) Patent No.: US 6,757,072 B1
(45) Date of Patent: Jun. 29, 2004

(54) METHOD FOR TRAPPING SUPPRESSION FOR THIN GRAPHICAL OBJECTS USING RUN LENGTH ENCODED DATA

(75) Inventor: Jon S. McElvain, El Segundo, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/538,596

(22) Filed: Mar. 29, 2000

(51) Int. Cl.$^7$ ............................................. G06K 15/00
(52) U.S. Cl. ...................... 358/1.15; 382/245; 358/1.9; 358/1.1
(58) Field of Search ................................ 382/245, 151, 382/167, 232, 294; 358/1.1–1.9, 1.11–1.18, 537, 401, 426.02, 426.15, 426.16, 448, 452, 453; 345/55, 621, 674, 788, 794, 33; 715/521, 526, 517, 540

(56) References Cited

U.S. PATENT DOCUMENTS

| | | | | |
|---|---|---|---|---|
| 4,931,861 A | * | 6/1990 | Taniguchi | ................... 382/167 |
| 5,131,058 A | * | 7/1992 | Ting et al. | ................... 382/162 |
| 5,313,570 A | * | 5/1994 | Dermer et al. | .............. 345/589 |
| 5,542,052 A | * | 7/1996 | Deutsch et al. | ............. 345/589 |
| 5,613,046 A | * | 3/1997 | Dermer | ...................... 358/1.9 |
| 5,666,543 A | * | 9/1997 | Gartland | ..................... 715/526 |

* cited by examiner

Primary Examiner—King Y. Poon

(57) ABSTRACT

Trapping is a method well known in the graphical arts industry, and provides a remedy for color misregistration defects on printed images. The general technique of trapping involves the placement of a small patches of colored pixels at the edges of colored objects, such that the color associated with these patches appears neutral to the human eye relative to the original colors present. The technique of trapping, however, assumes the objects being trapped are much larger in dimension than the trap zone itself. For small objects, a visible hue shift relative to the original color may occur as a result of the trapping operation. For run length encoded data, the remedy for this is a method that determines the object size by inspecting the run length of a run to be trapped in the fast scan direction, and counting the number of runs above or below that run with an identical color. If the object size is determined to be greater than a specified number of pixels, the trapping operation is performed; otherwise it is suppressed.

5 Claims, 2 Drawing Sheets

| Scan line | | | | | | | | |
|---|---|---|---|---|---|---|---|---|
| A | 1 | 1 | 1 | 1 | 1 | 2 | 2 | 3 ... |
| B | 1 | 1 | 1 | 1 | 1 | 2 | 2 | 3 ... |
| C | 1 | 1 | 1 | 1 | 1 | 2 | 2 | 3 ... |
| D | 2 | 2 | 2 | 2 | 2 | 2 | 2 | 3 ... |
| E | 2 | 2 | 2 | 2 | 2 | 2 | 2 | 3 ... |
| F | 2 | 2 | 2 | 2 | 2 | 2 | 2 | 3 ... |

Boundary       1                            2            3

FIG. 1

| Scan line | A | 1 | 1 | 1 | 1 | 1 | 2 | 2 | 3 ... |
|---|---|---|---|---|---|---|---|---|---|
| | B | 1 | 1 | 1 | 1 | 1 | 2 | 2 | 3 ... |
| | C | 1 | 1 | 1 | 1 | 1 | 2 | 2 | 3 ... |
| | D | 2 | 2 | 2 | 2 | 2 | 2 | 2 | 3 ... |
| | E | 2 | 2 | 2 | 2 | 2 | 2 | 2 | 3 ... |
| | F | 2 | 2 | 2 | 2 | 2 | 2 | 2 | 3 ... |

Boundary    1                2     3

FIG. 2

| Scan line | A | 1 | 1 | 1 | 1 | 4 | 2 | 2 | 3 ... |
|---|---|---|---|---|---|---|---|---|---|
| | B | 1 | 1 | 1 | 1 | 4 | 2 | 2 | 3 ... |
| | C | 1 | 1 | 1 | 1 | 1 | 2 | 2 | 3 ... |
| | D | 2 | 2 | 2 | 2 | 2 | 2 | 2 | 3 ... |
| | E | 2 | 2 | 2 | 2 | 2 | 2 | 2 | 3 ... |
| | F | 2 | 2 | 2 | 2 | 2 | 2 | 2 | 3 ... |

Boundary    1                2     3

FIG. 3

| Scan line | A | 1 | 1 | 1 | 1 | 4 | 2 | 2 | 3 ... |
|---|---|---|---|---|---|---|---|---|---|
| | B | 1 | 1 | 1 | 1 | 4 | 2 | 2 | 3 ... |
| | C | 1 | 1 | 1 | 1 | 4 | 2 | 2 | 3 ... |
| | D | 2 | 2 | 2 | 2 | 2 | 2 | 2 | 3 ... |
| | E | 2 | 2 | 2 | 2 | 2 | 2 | 2 | 3 ... |
| | F | 2 | 2 | 2 | 2 | 2 | 2 | 2 | 3 ... |

Boundary    1                2     3

FIG. 4

| Scan line | | | | | | | | |
|---|---|---|---|---|---|---|---|---|
| A | 1 | 1 | 1 | 1 | 4 | 2 | 2 | 3 ... |
| B | 1 | 1 | 1 | 1 | 4 | 2 | 2 | 3 ... |
| C | 4 | 4 | 4 | 4 | 4 | 2 | 2 | 3 ... |
| D | 2 | 2 | 2 | 2 | 2 | 2 | 2 | 3 ... |
| E | 2 | 2 | 2 | 2 | 2 | 2 | 2 | 3 ... |
| F | 2 | 2 | 2 | 2 | 2 | 2 | 2 | 3 ... |

Boundary  1        2      3

FIG. 5

| Scan line | | | | | | | | |
|---|---|---|---|---|---|---|---|---|
| A | 1 | 1 | 1 | 1 | 1 | 2 | 2 | 3 ... |
| B | 1 | 1 | 1 | 1 | 1 | 2 | 2 | 3 ... |
| C | 2 | 2 | 2 | 2 | 2 | 2 | 2 | 3 ... |
| D | 2 | 2 | 2 | 2 | 2 | 2 | 2 | 3 ... |
| E | 2 | 2 | 2 | 2 | 2 | 2 | 2 | 3 ... |
| F | 5 | 5 | 3 | 3 | 3 | 3 | 3 | 3 ... |

Boundary  1    2        3      4

FIG. 6

| Scan line | | | | | | | | |
|---|---|---|---|---|---|---|---|---|
| A | 1 | 1 | 1 | 1 | 4 | 2 | 2 | 3 ... |
| B | 4 | 4 | 4 | 4 | 4 | 2 | 2 | 3 ... |
| C | 2 | 2 | 2 | 2 | 2 | 2 | 2 | 3 ... |
| D | 2 | 2 | 2 | 2 | 2 | 2 | 2 | 3 ... |
| E | 2 | 2 | 2 | 2 | 2 | 2 | 2 | 3 ... |
| F | 5 | 5 | 3 | 3 | 3 | 3 | 3 | 3 ... |

Boundary  1    2        3      4

METHOD FOR TRAPPING SUPPRESSION FOR THIN GRAPHICAL OBJECTS USING RUN LENGTH ENCODED DATA

BACKGROUND OF THE INVENTION

A technique for suppressing trapping for the boundary between two color areas where one is a thin line by testing the number of pixels which make up the thickness of the areas, the decision being based on run length encoded image data The technique of trapping provides a perceptual remedy for misalignment or misregistration of toner separations at the boundary between two colors, the effect of which is manifested in the form of a white gap or discolored band at the boundary. The result of trapping is the placement of a thin "trapping" strip at one of the two edges. The trap color is chosen to be perceptually "neutral" when placed in the vicinity of the color boundary, resulting in a color transition that appears artifact-free (i.e., without white gaps or overlapping colors) to the human eye when viewed from a sufficient distance.

For example, where there is a sharp edge between a dark area and a light area, the trap may replace one or more pixels at the boundary with intermediate pixels, to reduce the visual effect of any misregistration. The process usually involves determining where there is an edge between two pixels of different colors, sending a description of the two colors to a trap generator which decides which of the two edges should be changed, and to what color, and finally replacing the color of the selected pixel.

Trapping generators are described in U.S. patent applications Ser. Nos. 09/176 969, now abandoned 09/176 970, now abandoned and 09/177 276 now abandoned and trapping done on run length encoded image data is described in 09/409 541, now abandoned all of which are incorporated by reference herein.

For the typical operation, it is assumed that objects to be trapped are very large relative to the trapping region. Thus, the color of only a thin boundary will be changed, while the large internal area will have the original, correct, color. However, for objects smaller than a few pixels, trapping results in visible hue changes in the color of the entire object. For example, if a thin line is only two pixels in width, and the trap generator decides to change the color of those two pixels, the entire thin line color has been changed. If the thin line happens to be located near a larger object of the same initial color, , there will be a visible color shift along the line relative to the larger object, and the result of the trapping operation will be less desirable than no trapping at all. Therefore, a method by which trapping can be selectively suppressed for thin objects is desirable.

SUMMARY OF THE INVENTION

The prevention of thin line color shifts for data in the form of pixels can be accomplished by selectively suppressing trapping if the trapped line is thinner than a predetermined number of pixels. For example, the rule could be that if routine trapping is being applied to a two pixel boundary between areas, then trapping would be suppressed if the line is determined to be less than four pixels wide. This would guarantee that for a one pixel line, that pixel would not be changed in color, and for lines of two or more pixels, there would always be at least two pixels of the original color.

In this invention, it is assumed that the image data is run length encoded. In the this data format, contiguous pixels in the fast scan direction with the same color are grouped as "runs", described by a color, a length (in number of pixels), and other common attributes. For this type of data construction, a "scanline" will consist of a series of contiguous runs describing one raster line worth of image data This trapping process proceeds as follows.

1) Collecting in a buffer a number of scanlines of run length encoded image data equal to twice the minimum line width threshold (M). For an example, assume a threshold of two pixels (M=2), so the number collected of scanlines in the buffer would be four.

2) Determining the next "center" point that may require trapping, the point being the intersection of a vertical and horizontal line. The horizontal line is always in the center of the scan lines. Thus, in the case of four lines in the buffer, the horizontal line will have two lines above and two below. The vertical line will be through the next point at which any of the four scan lines exhibits a run (color) boundary (denoted a "segment boundary"). The colors of the pixels surrounding the point of intersection (upper left, upper right, lower left, lower right) are sent to the trapping generator and the color changes that should be made are received back.

3) If trapping is required in the fast scan direction, do so only if the length of the run in the fast scan direction is greater than M. That is, in the example, the trapping color change should be made only if the pixel to be changed is in a run of M or more pixels, and 4) if trapping of a run is required in the slow scan direction, do so only if there are M runs above or below of the same color.

5) repeat this sequence to find the next center point, from step 2.

6) At the end of the scan, output the topmost scan line in the buffer for printing (or further image processing), and roll the remaining scanlines up one line (e.g. scanline 2 becomes 1, 3 becomes 2, and 4 becomes 3). A new scanline of image data is then added at the bottom, and the process is repeated from step 2.

The result is a method for efficient suppression of trapping of thin objects, and an overall improvement of image quality, due to the facile nature of image data processing associated with the run length encoded format

BRIEF DESCRIPTION OF THE DRAWINGS

FIG. 1 is a bitmap representation of the image data for the input scanline buffer FIG. 2 shows the output scanline buffer corresponding to FIG. 1, prior to processing.

FIG. 3 shows the output scanline buffer corresponding to FIG. 1, following the trapping operation in the fast scan direction.

FIG. 4 shows the output scanline buffer corresponding to FIG. 1, following the trapping operation in both the fast and slow scan directions.

FIG. 5 shows the input scanline buffer following the discard of the topmost scanline, rolling of scanlines, and collection of a new scanline worth of data FIG. 6 shows the output scanline buffer following the emission of the topmost scanline, rolling of scanlines, and collection of a new scanline worth of data.

DETAILED DESCRIPTION OF THE INVENTION

This invention assumes a run length encoded form of raster data where the runs are of constant color. Also assumed is a trap generator that, given a pair of colors, returns 1) what color the trap should be, and 2) where the trap should be located.

The focus of this invention is determining whether to suppress traps thus produced based on the size of the object in which the trap is located. A basic assumption when using a typical trap generator is that both objects are large in comparison to the size of the trapping region. In this case, the interior of the objects will be printed in the original color. However, a thin object will show an objectionable hue shift.

The solution to this problem, using run length encoded image data, is to collect 2M scan lines worth of run data in a buffer, where M is the minimum line width below which trapping is not to be performed. An example of such a band of image data is shown in FIG. 1 where M=3, so six scan lines are collected, labeled A through F. Before boundary 2, scans A, B and C consist of a constant color (labeled "1"), while scans D, E and F consist of a second constant color (labeled "2"). Between boundaries 2 and 3, all pixels are the second color. After boundary 3 all pixels are a 3rd color.

FIG. 1 is a bitmap representation of the image data for the input scanline buffer. Of course, this figure shows the data as it would appear in bit-map form. The actual operation discussed here is performed earlier in the printing process, when the data is still in run length form. For scan lines A through F from boundary 1 to 3, this image can be expressed in run length form as follows.

A. 5 ($1^{st}$ color), 2 ($2^{nd}$ color)
B. 5 ($1^{st}$ color), 2 ($2^{nd}$ color)
C. 5 ($1^{st}$ color), 2 ($2^{nd}$ color)
D. 7 ($2^{nd}$ color)
E 7 ($2^{nd}$ color)
F 7 ($2^{nd}$ color)

The procedure starts by finding the first segment boundary. In this example, this occurs at the boundary on line C after 5 pixels, at which point line C changes from the first to the second color. From the run length data it can be seen that in the four pixel box surrounding the center point, that the upper left pixel is the first color and the other three are the second color.

This information is sent to the trap generator in two steps. The first step is sending to the trap generator the colors of the upper left and upper right pixels, to determine if either pixel should be trapped. If either is selected for trapping by the trap generator, then the system must decide if the trapping should be suppressed, by inspecting the fast scan run length of the run in which the pixel is located. In this numerical case, if the left pixel is selected for trapping, the trap will be allowed because the fast scan run length of that segment is 5, while if it is the right pixel, it will be suppressed since that run length is 2.

The second step is sending to the trap generator the colors of the upper left and lower left pixels, to determine if either pixel should be trapped. If the upper left run is selected for trapping (in the slow scan direction) by the trap generator, then the system must decide if the trapping should be suppressed. This is accomplished by determining (in the slow scan direction) the number of runs above the upper left run with an identical color. If it is found that this number is equal to the line width threshold, trapping is performed; otherwise the trapping operation is suppressed. A similar procedure is followed for the lower left run, where runs immediately below are inspected for a color match prior to trapping. In the numerical case, if either the upper left or lower left run is selected for trapping in the slow scan direction, the trapping operation will be allowed because the number of vertically adjacent runs with identical color both above and below the central point is equal to M (=3).

In a preferred embodiment, two separate scanline buffers are maintained ("input" and an "output"), in order to maintain separation between the raw data and modified data. The input buffer is simply used to inspect the incoming runs, and the output buffer is that which is actually modified by the trapping procedure described above. In this case, when the trapping operation is completed for all segment boundaries, the first scanline associated with the output buffer is emitted to the next stage, whether it be for printing or further processing.

As an example, consider the input scanline buffer configuration shown in FIG. 1. Prior to processing this input data, the corresponding output scanline buffer might appear as shown below in FIG. 2.

FIG. 2 shows the output scanline buffer corresponding to FIG. 1, prior to processing. The color "4" that appears at the end of the first run in scanlines A and B result from previous trapping operations. Referring to FIG. 1, the runs intersecting on scanlines C and D at segment boundary 2, are to be considered for color comparison in the trapping method. First, the trap generator will inspect the colors corresponding to the upper left (color=1) and upper right (color=2) runs in the input buffer. In this case assume the trap generator specified trapping in the fast scan direction of one pixel into the upper left run, with a color of "4". Since the fast scan length of the upper left run is greater than M=3, the trapping will be performed. The output buffer will then appear as shown in FIG. 3.

FIG. 3 shows the output scanline buffer corresponding to FIG. 1, following the trapping operation in the fast scan direction. The run length encoded description of scanline C in the output buffer would then be:

C 4($1^{st}$ color), 1($4^{th}$ color), 2($2^{nd}$ color)

Next, the trap generator will inspect the colors of the upper left (color=1) and the lower left (color=2) runs in the input buffer, at segment boundary 2. In this case, the trap generator would specify modification of the entire upper left run (as defined in the input buffer) between segment boundaries 1 and 2, to a color equal to 4. However, prior to performing the trapping operation, the number of runs directly above (and including) the upper left run with a color equal to that of the upper left run is counted. In the example shown in FIG. 1, there are a total of three runs with identical color (=1) above scanline D, and between segment boundaries 1 and 2. Since this number is equal to the linewidth threshold M=3, the trapping operation would therefore be performed. The resulting output scanline buffer data would appear as shown in FIG. 4.

FIG. 4 shows the output scanline buffer corresponding to FIG. 1, following the trapping operation in both the fast and slow scan directions (at segment boundary 2). The run length encoded description of scanline C in the output buffer would then be:

C 5($4^{th}$ color), 1($4^{th}$ color), 2($2^{nd}$ color), . . .

Assuming the trapping operation has been completed for all segment boundaries in the input buffer, the topmost scanline in the output buffer is emitted to the next stage (whether is be the printer or the next image processing module), and the topmost scanline in the input buffer is discarded. For both scanline buffers, the scanlines are "rolled", i.e. scanline B becomes A, C becomes B, etc. Subsequently, a new scanline worth of data is collected into the bottommost scanline (F), which will be identical for the input and output buffers (since this data has not been trapped). The input and output scanline buffers would then appear as shown in FIG. 5. The trapping sequence is then repeated for this new input buffer configuration.

FIG. 5 shows the input scanline buffer following the discard of the topmost scanline, rolling of scanlines, and collection of a new scanline worth of data. Note the segment boundaries have now changed as a result of the new data in scanline F.

FIG. 6 shows the output scanline buffer following the emission of the topmost scanline, rolling of scanlines, and collection of a new scanline worth of data While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method for suppressing trapping of a thin object containing run length encoded image pixel data, comprising:

collecting a number of scanlines of run length encoded pixel data equal to 2M, where M is a line width trap threshold;

determining a pixel within the collected scanlines that requires trapping;

determining if trapping is required in a fast scan direction or a slow scan direction;

if trapping is required in the fast scan direction, determining the length of the run containing the pixel requiring trapping; and if the length of the run containing the pixel requiring trapping is less than M, suppressing trapping for that pixel.

2. The method of claim 1, further comprising:

if trapping is required in the slow scan direction, determining the number of runs above and below the pixel to be trapped that possess the same color;

if the number of runs above or the number of runs below the pixel to be trapped that possess the same color is less than M, suppressing trapping for that pixel.

3. The method of claim 1, further comprising:

determining a center point of a segment boundary between two colors that may require trapping; and sending the upper left pixel, upper right pixel, lower left pixel and lower right pixels surrounding the center point to a trapping generator to determine if any of the pixels should be trapped.

4. The method of claim 1, wherein M is the minimum line width below which trapping is not to be performed.

5. The method of claim 3, further comprising:

outputting the topmost scanline for further image processing;

rolling the remaining scanlines up one line;

adding a new scanline of image data at the bottom; and repeating the rest of the steps in the method.

* * * * *